United States Patent
Wong

(10) Patent No.: US 6,167,683 B1
(45) Date of Patent: Jan. 2, 2001

(54) PACKAGING DEVICE

(75) Inventor: Chi Kin Wong, Hong Kong (HK)

(73) Assignee: Kyorin Group (China) Ltd. (HK)

( * ) Notice: Under 35 U.S.C. 154(b), the term of this patent shall be extended for 0 days.

(21) Appl. No.: 09/326,923

(22) Filed: Jun. 7, 1999

(30) Foreign Application Priority Data

Jun. 9, 1998 (CN) .................................................. 98224233

(51) Int. Cl.$^7$ .............................. B65B 47/00; B65B 47/10
(52) U.S. Cl. .............................. 53/559; 53/282; 137/595; 251/5
(58) Field of Search .................. 53/282, 559; 137/595; 251/5

(56) References Cited

U.S. PATENT DOCUMENTS

| | | | |
|---|---|---|---|
| 4,120,984 | * 10/1978 | Richardson et al. | 426/412 |
| 4,233,801 | * 11/1980 | Watt | 53/453 |
| 4,565,052 | * 1/1986 | Hautemont | 53/453 |
| 4,907,394 | * 3/1990 | Tschepke | 53/412 |
| 5,009,056 | * 4/1991 | Porteous | 53/412 |
| 5,319,910 | * 6/1994 | Takata et al. | 53/412 |

* cited by examiner

*Primary Examiner*—Peter Vo
*Assistant Examiner*—Hemant M. Desai
(74) *Attorney, Agent, or Firm*—Jackson Walker L.L.P.

(57) ABSTRACT

A packaging device for continuously forming and filling a package having a plurality of separate sealed cavities comprises a plastic film winding barrel, a vacuum cavity forming device, a filling means, an aluminum foil winding barrel, a pressing sealing means, and a cutting machine. The vacuum cavity forming device causes the plastic film to be formed with a plurality of cavities. The filling means pumps liquid material into each of the cavities holes. Aluminum foil is adhered to the strip plastic casing by a pressing sealing means. Finally, the cutting machine serves to the cut the strip casing to complete a packaging process.

1 Claim, 8 Drawing Sheets

PACKAGING DEVICE

BACKGROUND OF THE INVENTION

1. Field of the Invention

The invention relates to a packaging device, and particularly to a packaging device for forming a plastic case to receive fillings during the packaging process.

2. Description of Prior Art

In general, it is known to fill small plastic cases each formed as one of a plurality of concave cavities and then apply an aluminum foil to seal each cavity. In the prior art, the plastic cases are finished in advance then the plastic cases are taken to another device where they are arranged on a moving belt that passes a material filling station. The plastic cases are positioned below a material filling opening and liquid filling material is poured into the concave cavities of the plastic cases. An aluminum foil is then adhered over the plastic cases to seal off the cavities. It is appreciated that in the current technology, since the devices for filling material and packing plastic case are two separate devices, the process for packaging is inconvenient and the overall speed is slow. Moreover, since the filling material is liquid, in general, plug pumps are used for containing and extruding the filling material. The plug pump each fill one cavity at a time, thus at least one bank of plug pumps are necessary at a material filling station. With only one bank of cavities filled at a time, and the filling speed is slow. If it is desired to increase the filling speed, multiple banks of plug pumps can be installed, but the structure of the plug pump is complicated. It has a larger capacity and is inconvenient to mount, and the price is expensive. Further, during extrusion of the filling material, the liquid material must flow through the plug pump so that the material will contact with inner parts of the pump and may be polluted by the device, or the pump may be polluted by the filling material and be destroyed. Also, the filling liquid often contains particle material which easily accumulates in a sliding section between the plug and the piston of the pump so that the sliding of the plug may fail.

A pressing plastic sealing means is required, for sealing the plastic casing with an aluminum foil layer, and a template on a machine table. A pressing plate is arranged above the template for transferring the plastic cases and the aluminum foil between the template and the pressing plate. The position and shape of the cavities are aligned with holes in the template so that the aluminum foil is pressed to the plastic case by the pressing plate to seal the cavities. In order to extract a filling from the cavities, a foldable line is provided in the cavities so that a user may remove a filling by breaking the casing along the fold line. Fillings in other cavities are retained. However, the contact plane between the template and the pressing plate is not a complete plane, and the material of the plastic case and the aluminum foil is very thin. During pressing, some gaps will exist in some parts of the plastic case and the aluminum foil and thus the aluminum foil cannot be pressed completely against the plastic case. Some aluminum foil will be adhered to the plastic case, so that two adjacent concave holes cannot be isolated completely, and thus the filling of one cavity may flow to another adjacent cavity. As a result, an unsatisfactory packaging is produced. For sealing over a large area, a complete plane is very difficult to achieve. Moreover, in the process, a heating step is necessary. This causes the deformation of a real plane, and complete sealing cannot normally be attained.

SUMMARY OF THE INVENTION

According to the invention there is provided a packaging device for continuously forming and filling a package having a plurality of separated sealed cavities comprising, arranged in sequence, a plastics film winding barrel, a vacuum cavity forming device, a filling means, an aluminum winding barrel and a pressing sealing means, in which a sheet of plastics film is fed through the device, formed with a plurality of rows of cavities across its width, the cavities are filled, an aluminum foil is placed against the sheet to close off the cavities and sealed to the sheet to form the packaging.

The packaging device may include a cooling device to cool the packaging and a cutting machine to cut the cooled packaging into suitable strips.

One embodiment of the invention comprises a packaging device for forming and filling a package having a plurality of separate sealed cavities comprising a plastics film winding barrel, a vacuum cavity forming device, a filling means, an aluminum foil winding barrel, a pressing sealing means and a cutting machine, which are sequentially arranged on a machine table, wherein the plastic film winding barrel is mounted at a front of the machine table;

the vacuum cavity forming device is mounted next to the plastic film winding barrel, and a heater is mounted between the vacuum cavity forming device; and the plastics film winding barrel, the filling means is mounted next to the vacuum shaping device, the filling means having an upper substrate being arranged with a pressing plate movable upwards and downwards and a plurality of through-holes, each of the through-holes has a material inlet and a material outlet, a bottom of the pressing plate is provided with a plurality of soft plastic covers corresponding to each through-hole, the soft plastic cover being firmly secured above each through-hole, the material inlet and the material outlet have respective flexible tubes below the through-holes of the upper substrate and pass through the lower substrate, two overlapped comb clip valves are arranged on the lower substrate, the comb clip valve being formed by a fixed comb clip and an movable comb clip, the movable comb clip is driven by a hydraulic piston, the fixed comb clip and the movable comb clip are arranged with a plurality of clamping pins on one side or both sides of respective long seats, the clamping pins of the fixed comb clip and the movable comb clip being arranged alternatively in a plane, the flexible tubes of the material inlet and the material outlet pass through between the two clamping pins of the fixed comb clip and the movable comb clip;

the aluminum foil winding barrel is mounted next to the filling means, the pressing plastic sealing means is mounted beyond the aluminum foil winding barrel, the pressing sealing means is formed with a substrate on the machine table, a soft pad is installed above the substrate, and a plurality of parallel connecting blocks are installed thereon, each of the connecting blocks are penetrated by at least two transversal rods, each transversal rod passes through a lower template formed by a plurality of sub-templates, an upper template is mounted above the lower template on the machine table so that the upper template can press against the lower template, a cooling device is mounted beyond the pressing plastic sealing means; and the cutting machine is mounted beyond the cooling means; the cutting machine being formed by a corner cutting machine and a cutting knife machine.

BRIEF DESCRIPTION OF THE DRAWING

A packaging device according to the invention will now be described by way of example with reference to the accompanying drawings in which.

DESCRIPTION OF THE PREFERRED EMBODIMENTS

Figure 1:
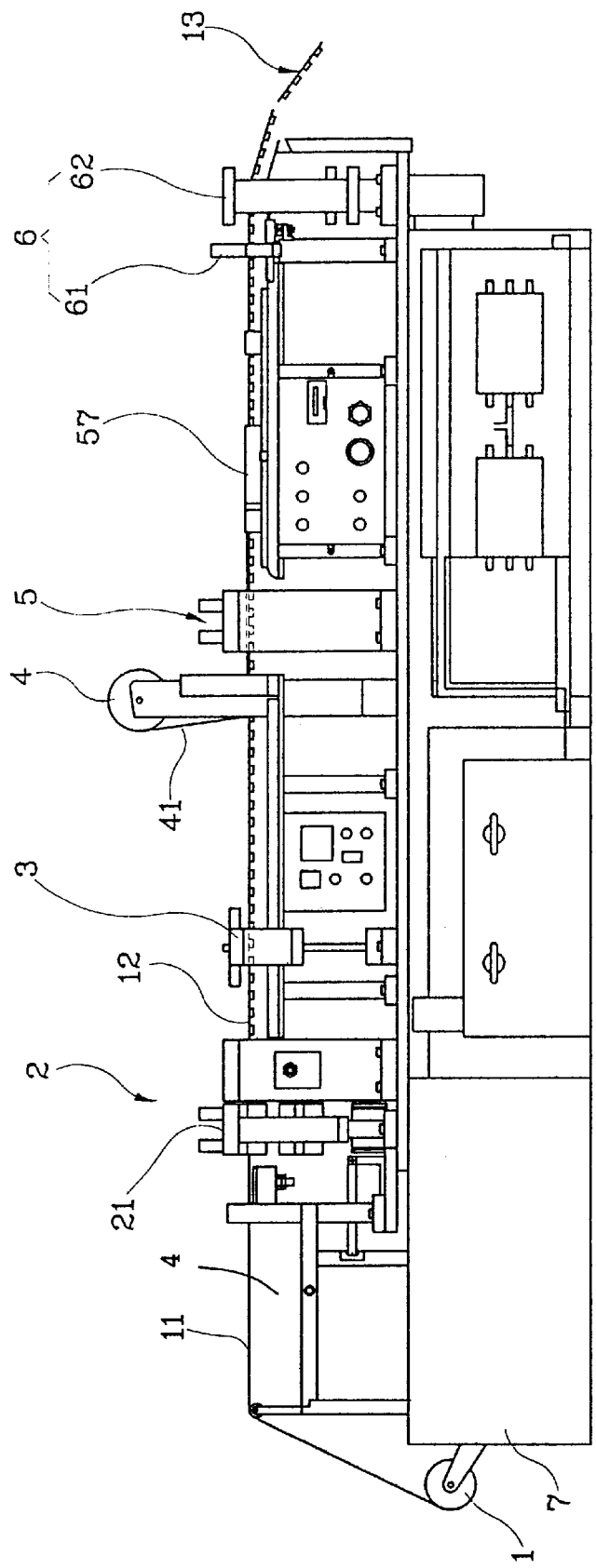
FIG. 1 is a side view of the packaging device.

Referring to the drawings, in FIG. 1 the packaging device includes a plastic film winding barrel 1, a vacuum cavity forming device 2, a filling means 3, an aluminum foil winding barrel 4, a pressing plastic sealing means 5, and a cutting machine 6.

The plastic film winding barrel 1 is mounted at one end of a machine table 7. The vacuum cavity forming device 2 is mounted next to the plastic film winding barrel 1 and a heater 4 is arranged in front of the vacuum cavity forming device 2. The heater serves to soften the plastic film 11 and then by application of a vacuum, the softened plastic film 11 is shaped to be formed with a plurality of concave holes 121. Such cavity forming devices are per se well known.

Figure 2:
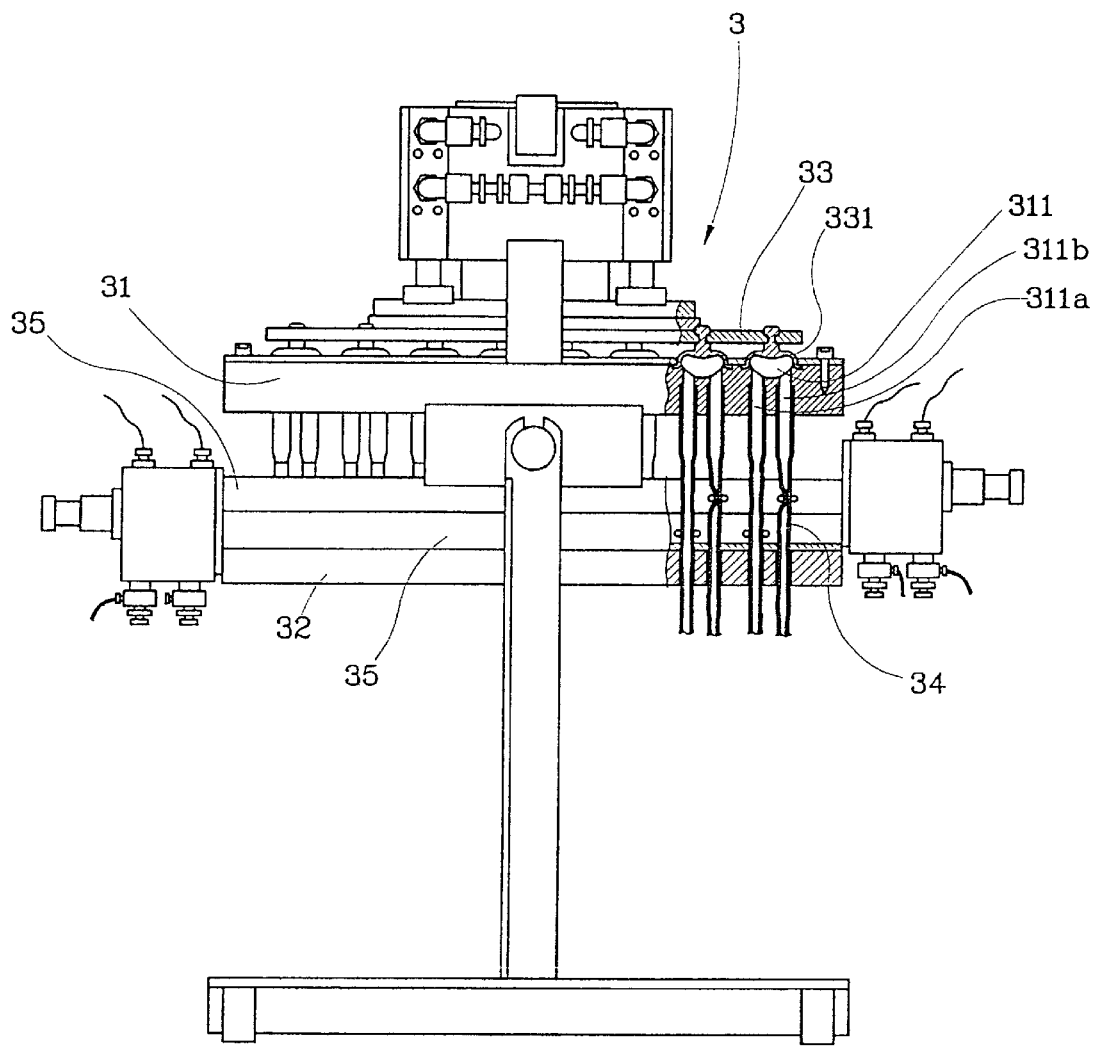
FIG. 2 is a sectional view of a filling means of the device.
Figure 3:
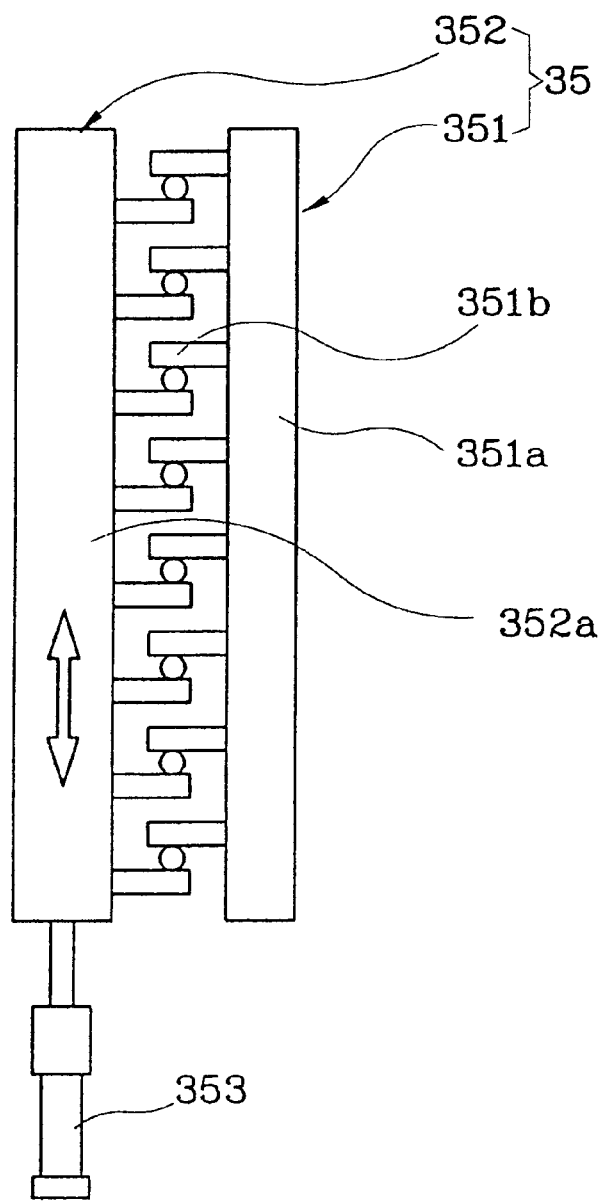
FIG. 3 is a schematic top view of a comb clip valve of the filling means.
Figure 4:
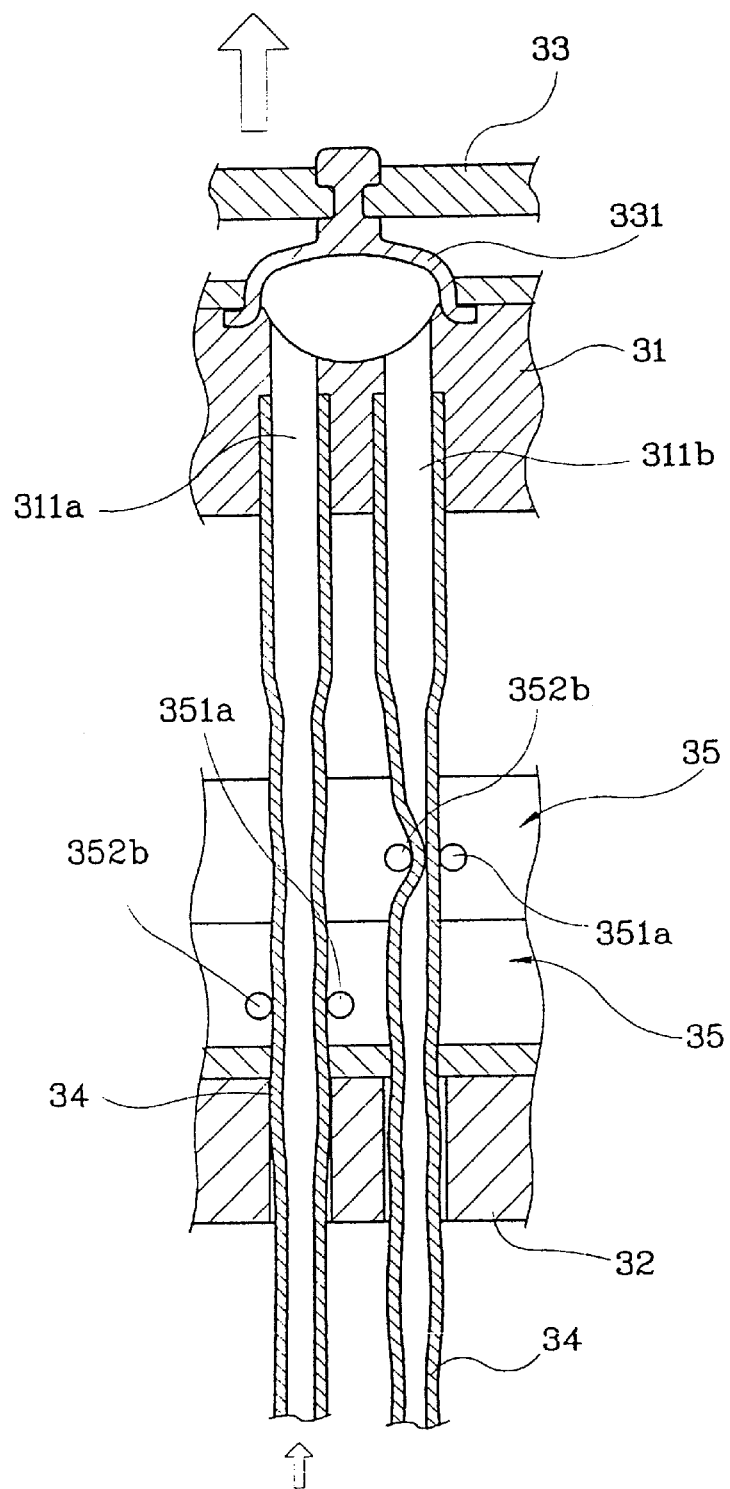
FIG. 4 is a sectional view of part of the filling means.
Figure 5:
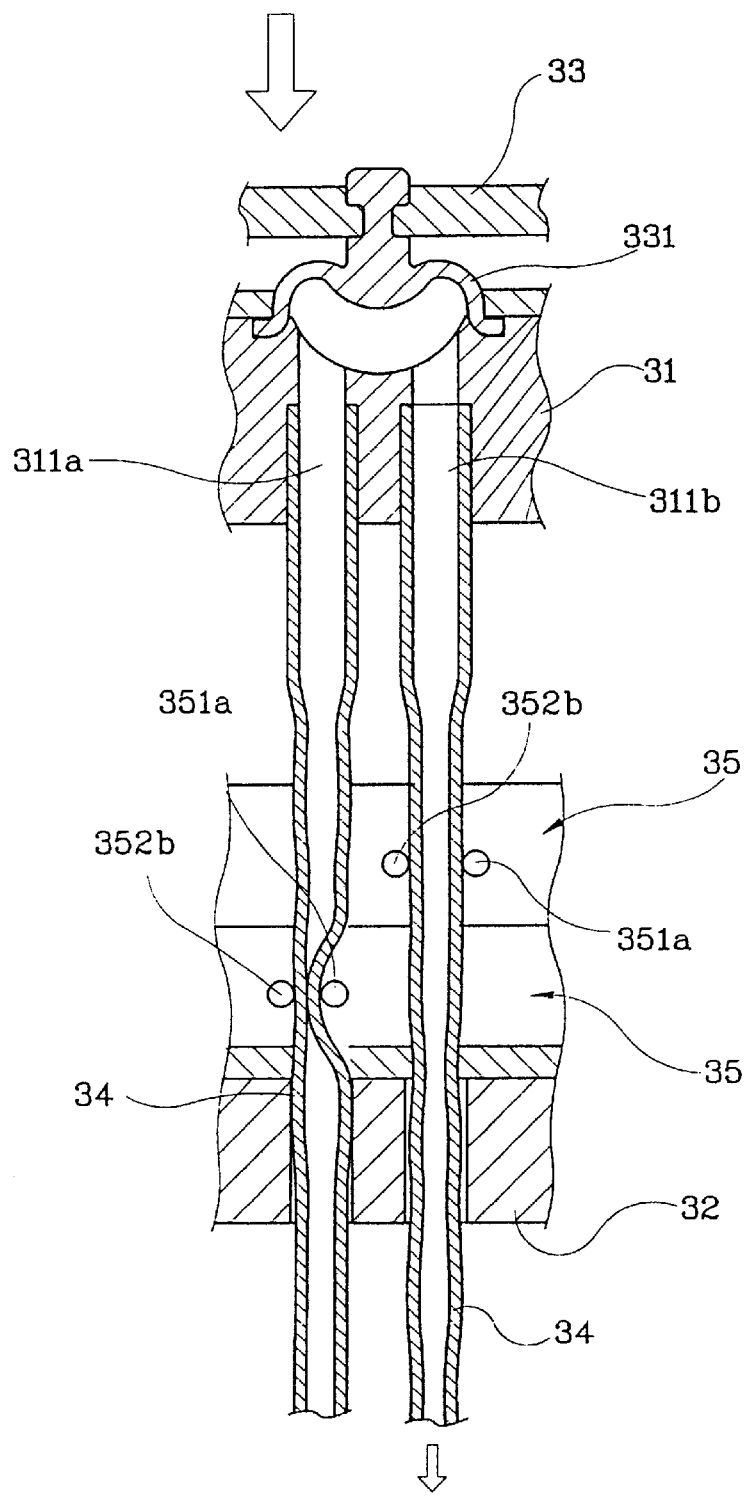
FIG. 5 is another sectional view of part of the filling means.

The filling means 3 is mounted next to the vacuum shaping device 2. The filling means 3 is installed with an upper substrate 31 and a lower substrate 21 on the machine table. The upper substrate 31 is arranged with a pressing plate 33 movable upwards and downwards and has a plurality of through-holes 311. Each of the through-holes 311 has a material inlet 311a and a material outlet 311b. A bottom of the pressing plate 33 is fixed with a plurality of soft plastic covers 331 corresponding to the through-holes. A respective soft plastic cover 311 is firmly secured above the through-holes 311. The material inlet 311a and the material outlet 311b have respective flexible tubes 34 below the through-holes 311 of the upper substrate 31. The flexible tubes 34 pass through the lower substrate 32. Two overlapping comb clip valves 35 are arranged on the lower substrate 32. The comb clip valve 35 is formed by a fixed comb clip 351 and an movable comb clip 352. The movable comb clip 352 is driven by a hydraulic piston 353, as shown in FIG. 2. The fixed comb clip 351 and the movable comb clip 352 are arranged vertically with a plurality of clamping pins 351b and 352b on one or both sides of long seats 351a and 352a. Further, the clamping pins 351b and 352b of the fixed comb clip 351 and the movable comb clip 352 are arranged alternately in a plane, as shown in FIG. 3. The flexible tubes 34 of the material inlet 311a and the material outlet 311b pass through between the two clamping pins 351b and 352b of the fixed comb clip 351 and the movable comb clip 352. The clamping pins 352b of the movable comb clip 352 can press against the clamping pins 351b of the fixed comb clip 351, to close the flexible tube 34. The pins can be separated so that the flexible tube 34 is open, as shown in FIGS. 4 and 5. By the upward and downward movement of the pressing plate 33, the soft plastic over 331 above the through-hole 311 is compressed from two sides so that liquid material is pumped into the through-hole 311 and liquid material flows into the cavity 121.

The aluminum foil winding barrel 4 is mounted next to the filling means 3.

Figure 6:
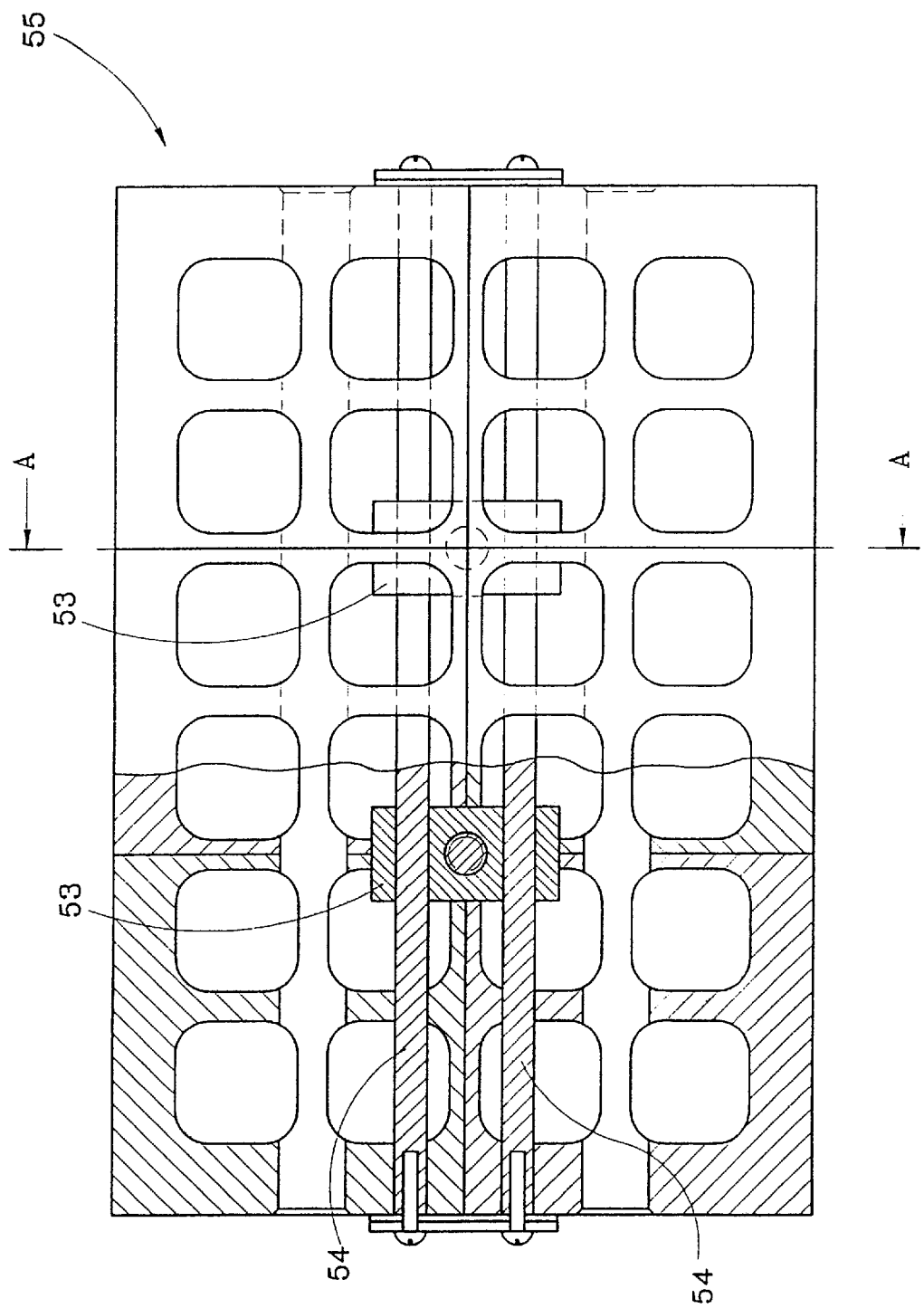
FIG. 6 is a top view showing a lower template of a pressing sealing means of the device.
Figure 7:
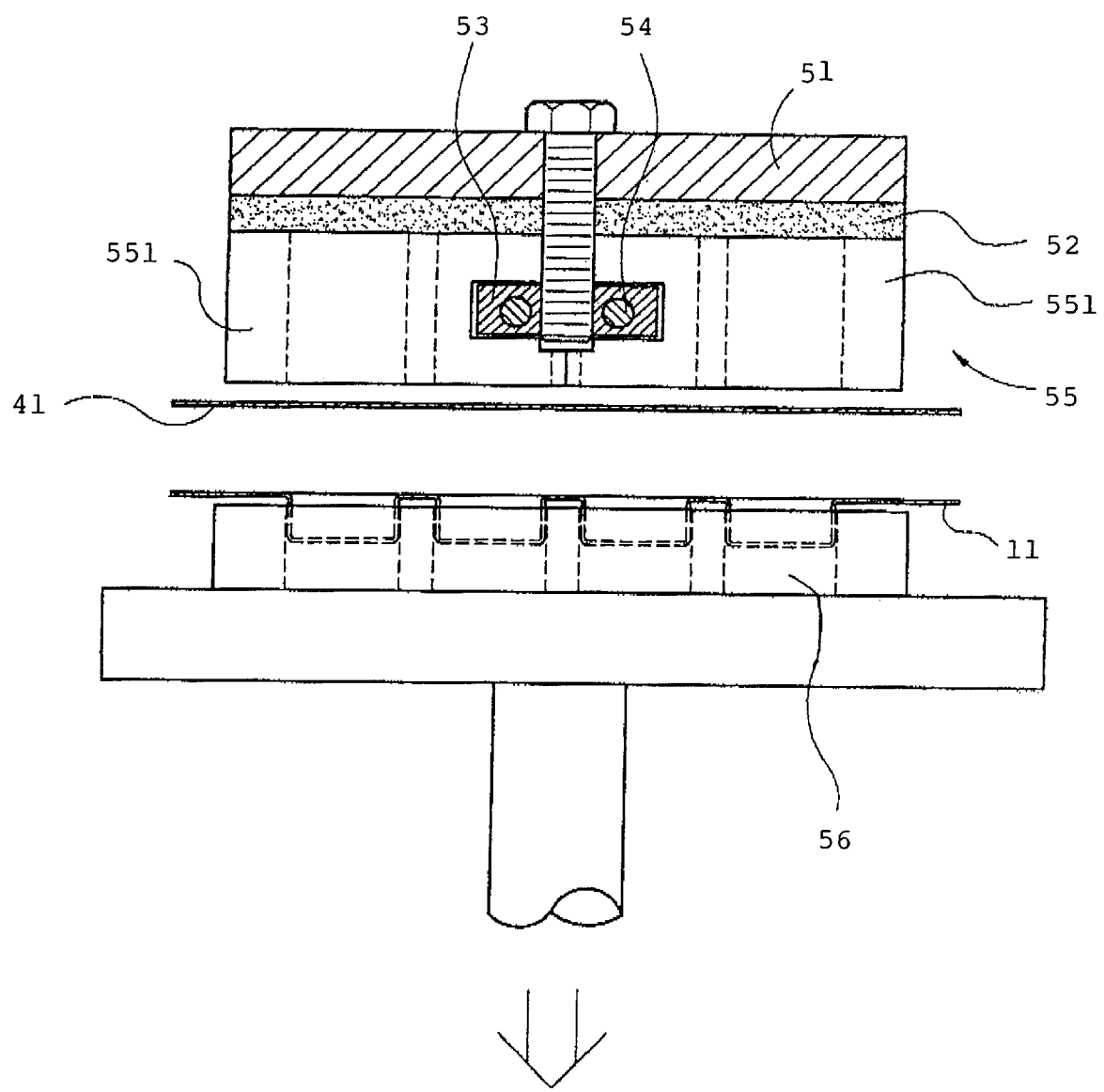
FIG. 7 is a cross sectional view of the pressing sealing means.

The pressing sealing means 5 is positioned next to the aluminum foil winding barrel 4. The pressing sealing means 5 is formed with a substrate 51 on the machine table 7. A soft pad 52 is installed above the substrate 51, and a plurality of parallel connecting blocks 53 are mounted thereon. Each of the connecting blocks 53 is penetrated by at least two transversal rods 54. Each transversal rod 54 extends to a lower template 55 formed by a plurality of sub-templates 55. An upper template 56 is installed above the lower template on the machine table 7 so that the upper template 56 can press against the lower template 55. The sub-template 551 presses against the soft pad 52 and swings upwards and downwards around the transversal rod 54 so that the sub-template 551 may swing to press against the lower side of the upper template 54. Thus, the plastic case 12 in which the cavities are formed may be completely sealed off by the aluminum foil strip 41, as shown in FIGS. 6 and 7. A cooling device 57 is mounted next to the pressing sealing means 5 for cooling the sealed strip plastic case 12.

Figure 8:
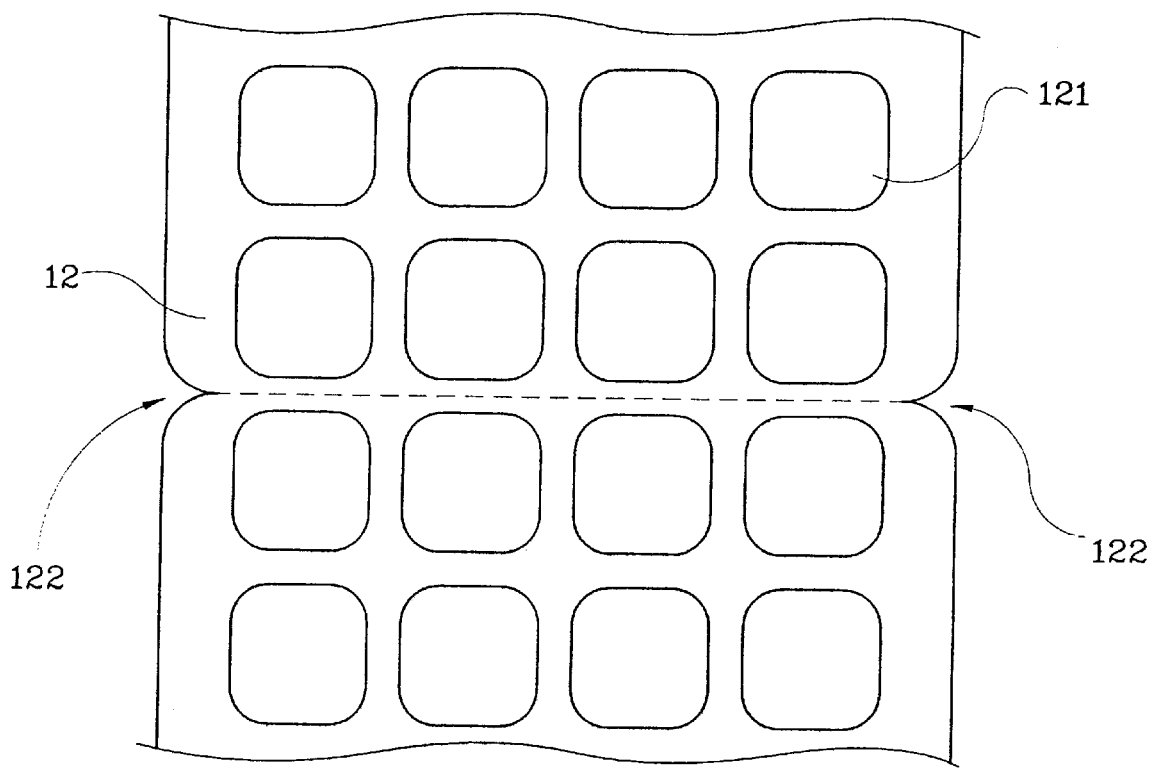
FIG. 8 is a partial view of a strip plastic case formed by the device.

The cutting machine 6 is mounted at a remote end of the machine table 7. The cutting machine 6 is formed by a corner cutting machine 61 and a cutting knife machine 62. The corner cutting machine 61 serves to form an angle by cutting away at two sides of a packaged strip plastic case 12, as shown in FIG. 8. The cutting knife machine 62 is arranged to cut the strip plastic case at a cutting angle to complete the packaging process.

Thus, in the complete single process described above, the plastic film 11 of the plastic film winding barrel 1 is first softened by heating. Then the vacuum cavity forming device 2 serves to shape the softened plastic film to form a strip plastic case 12 with a plurality of cavities 121. Then a filling means 3 is used to supply liquid filling to the cavities 121 in sequence. After filling the cavities, the pressing sealing means 2 serves to adhere an aluminum foil strip 41 to the strip plastic case 12. The cutting machine 6 is employed to cut the strip plastic case 12 with angles, and the strip plastic case is further cut to form a plastic case 13. Since the shaping of the plastic case 13, the filling, packaging and the cutting operation are performed sequentially, the overall packaging time is reduced greatly over the prior art arrangements, and embodiments of the invention lend themselves conveniently to mass-production and lower costs.

It will be noted that the filling means 3 is arranged so that the comb clip valve 35 and the movable comb clips 352 are moved outwards by the hydraulic piston 353. The clamping pin 352b of the movable comb clip 353 and the clamping pin 351b of the fixing comb clip 351 are separated so as not to clamp the flexible tube 34 of the material inlet 311a, therefore, the flexible tube is in a communicating state, as shown in FIG. 4. While the movable comb clip 352 of another comb clip valve 35 is driven by the hydraulic piston 353 so that the clamping pin 352b at the movable comb clip 352 presses against the clamping pin 351b of the fixing comb clip 351 so as to clamp and close-off the flexible tube 34 of the material outlet 311b, as shown in FIG. 5. At this time, the pressing plate 33 will move upwards so that a vacuum is applied to the through-hole 311 of the upper substrate 31. Therefore, material is drawn into the through-hole 311 from the flexible tube 34 of the material inlet 311a. After liquid material has entered into the through-hole 311 of the upper substrate 31, the movable comb clip 352 of the comb clip valve 35 will be driven by the hydraulic piston 353 so that the clamp pin 352b of the movable comb clip 352 presses against the clamp pin 351b of the fixed comb clip 351. Thus, the flexible tube 34 of the material inlet 311a is in a sealing state. While the movable comb clip 352 of the comb clip valve 35 is driven by the hydraulic piston 353 so that the clamp pin 352b will not clamp the clamp pin 351b of the fixed comb clip 351, and thus the flexible tube 34 of the material outlet 311b is in communicating state. The pressing plate 33 will then press downwards, and liquid material within the through-hole 311 will flow out through the flexible tube 34 of the material outlet 311b.

The through-hole 311 and the soft plastic case 311 for absorbing and extruding liquid material are installed on the upper substrate 31 and the through-hole 311 is formed on the substrate 31. With the pressing plate 33 to press the soft plastic case 331, and the two comb clip valves 35 controlling the flowing of the liquid material, the whole structure may be formed in a cylinder and thus the cost of the packaging device is reduced advantageously.

It will be noted that since the liquid material is compressed by the soft plastic case 331, and the through-hole 311 is experiencing a vacuum, liquid may be absorbed or extruded. Even if some solid particles are contained in the liquid filling material, the absorption and extrusion operation can still perform well and no damage is caused with such an arrangement.

In the lower template 55, a plurality of sub-templates 551 are pivotally mounted on the transversal rod 54, and a flexible soft pad 56 is provided below the sub-template 551. When the upper template 56 is pressed against the lower template 55, if the contact surface of each sub-template 551 and the upper template 56 are not even, the sub-template 551 can rotate upwards and downwards by itself so that the sub-templates 551 can still press firmly against the upper template 56. Therefore, the strip plastic case 12 and the aluminum foil strip 41 may be firmly pressed together to provide a complete sealing.

After the packaging is completed, the corner cutting machine serves to form a cutting angle 122 by cutting away at two sides of a packaged strip plastic case, then the cutting knife machine 62 cuts the strip plastic case from the cutting angle 122, therefore, a packaged plastic case 13 is formed.

For larger area packaging, the area for sealing may be divided into a plurality of sub-templates 551, each for a part of the total area, thus incomplete sealing is avoided. Moreover, since a sealing plane for the smaller areas is easily attained, a better sealing is achieved. Adjacent cavities 121 on the plastic case after packaging are separated completely in order to avoid plastic material within the concave hole 121 being broken, and filling material draining out due to incomplete sealing.

Moreover, since it is necessary to heat the plastic combination, while the lower template 55 is formed by a plurality of smaller area sub-templates 551, and because smaller area sub-templates allow a larger deformation than a large area, a near plane is more easily retained. As a result, any problem of deformation of the sub-template is reduced.

I claim:

1. A packaging device for forming and filling a package having a plurality of separate sealed cavities comprising a plastics film winding barrel, a vacuum cavity forming device, a filling means, an aluminum foil winding barrel, a pressing sealing means and a cutting machine, which are sequentially arranged on a machine table, wherein the plastic film winding barrel is mounted at a front of a machine table;

the vacuum cavity forming device is mounted next to the plastic film winding barrel, and a heater is mounted between the vacuum cavity forming device; and the plastics film winding barrel, the filling means is mounted next to the vacuum shaping device, the filling means having an upper substrate being arranged with a pressing plate movable upwards and downwards and a plurality of through-holes, each of the through-holes has a material inlet and a material outlet, a bottom of the pressing plate is provided with a plurality of soft plastic covers corresponding to each through-hole, the soft plastic cover being firmly secured above each through-hole, the material inlet and the material outlet have respective flexible tubes below the through-holes of the upper substrate and pass through the lower substrate, two overlapped comb clip valves are arranged on the lower substrate, the comb clip valve being formed by a fixed comb clip and an movable comb clip, the movable comb clip is driven by a hydraulic piston, the fixed comb clip and the movable comb clip are arranged with a plurality of clamping pins on one side or both sides of respective long seats, the clamping pins of the fixed comb clip and the movable comb clip being arranged alternatively in a plane, the flexible tubes of the material inlet and the material outlet pass through between the two clamping pins of the fixed comb clip and the movable comb clip;

the aluminum foil winding barrel is mounted next to the filling means, the pressing plastic sealing means is mounted beyond the aluminum foil winding barrel, the pressing sealing means is formed with a substrate on the machine table, a soft pad is installed above the substrate, and a plurality of parallel connecting blocks are installed thereon, each of the connecting blocks are penetrated by at least two transversal rods, each transversal rod passes through a lower template formed by a plurality of sub-templates, an upper template is mounted above the lower template on the machine table so that the upper template can press against the lower template, a cooling device is mounted beyond the pressing plastic sealing means; and the cutting machine is mounted beyond the cooling means; the cutting machine being formed by a corner cutting machine and a cutting knife machine.

\* \* \* \* \*